Patented Dec. 17, 1935

2,024,476

UNITED STATES PATENT OFFICE 2,024,476

PROCESS OF SECURING SULPHUR DIOXIDE EXTRACT OF PETROLEUM

John T. Rutherford, Berkeley, Calif., assignor to Standard Oil Company of California, San Francisco, Calif., a corporation of Delaware No Drawing. Application August 8, 1932, Serial No. 628,004

11 Claims. (Cl. 196—37)

This invention relates to a process of separating the unsaturated and aromatic hydrocarbons from petroleum oils or like hydrocarbon oils, such as shale oil, and in particular relates to a process of extracting petroleum oils and like hydrocarbon oils with sulphur dioxide so as to secure products relatively high in aromatic and unsaturated constituents, and includes also the products thus derived.

Petroleum oil, particularly the cracked products thereof, contains a considerable quantity of aromatic, unsaturated and sulphur bearing bodies. These bodies are useful for various purposes, such, for example, as odorants for natural gas, denaturants of alcohols and esters and solvents for different purposes. A partial separation of the sulphur bodies, unsaturated bodies and aromatics from the saturated bodies of petroleum can be effected by the use of the ordinary Edeleanu method of treating hydrocarbon mixture of the same with sulphur dioxide. Upon treating the hydrocarbon oil containing a mixture of aromatic, unsaturated and sulphur bodies with liquid sulphur dioxide, there are separated two layers; one containing the greater part of the liquid sulphur dioxide and relatively rich in the unsaturated and aromatic and sulphur bodies, while the other layer contains the greater part of the saturated constituents of the oil. Upon distillation or other removal of the sulphur dioxide from the sulphur dioxide extract, an unsaturated oil is obtained fhich contains a high carbon hydrogen ratio and a relatively high percentage of sulphur, and contains high percentages of unsaturated aromatic and sulphur bodies.

As described in the co-pending application of William N. Davis and John T. Rutherford, Serial No. 628,003, filed Aug. 8, 1932, now Patent No. 1,949,244, issued February 27, 1934, this sulphur dioxide extract of petroleum is an excellent denaturing material for alcohols and esters in that it can not be separated from alcohols or esters by ordinary physical means, such as distillation, freezing, dilution or filtering.

I have further discovered that a more concentrated form of the unsaturated constituents of petroleum may be derived by subjecting this sulphur dioxide extract to a further extraction operation with sulphur dioxide in the presence of a refined oil. By admixing with extracted oil a refined hydrocarbon oil of a distinctly different boiling point range and then subjecting the admixture to a second sulphur dioxide extraction, followed by a re-distillation of the extracted oil and separating it from the sulphur dioxide, there is obtained as a product a material having an appreciably higher carbon to hydrogen ratio and containing, therefore, an appreciably greater concentration of unsaturated and aromatic constituents. The product so produced is found to possess many utilities. For example, when used as a denaturant for alcohols, the alcohols may be subjected to greater dilution before there is any appearance of turbidity. It is also a better solvent for paints and other materials.

The present invention, together with various objects and advantages thereof, will best be understood from a description of a preferred form or forms of processes and products embodying the invention. For this purpose, there is hereafter described a number of examples of processes and products which embody this invention.

In one example of the invention, a crude pressure naphtha obtained from the pyrogenetic cracking of California fuel oil was first topped or reduced to a 200° F. initial boiling point. This topped pressure naphtha was treated with twice its volume of liquid sulphur dioxide, according to the ordinary Edeleanu method. The topped naphtha before treatment had the following characteristics:

| | |
|---|---:|
| Gravity °A. P. I. | 47.3 |
| Initial boiling point | 208° F. |
| 20% | 250° F. |
| 50% | 280° F. |
| 90% | 386° F. |
| Final boiling point | 506° F. |
| Per cent sulphur | .73 |
| C/H ratio | 85.10/13.27 |
| Miscibility with an equal volume of 95% ethyl alcohol | |
| Complete above | 87° F. |
| Aniline point | |
| 200–300° F. fraction | 100.5° F. |
| 300–400° F. fraction | 98.0° F. |

After contact of such topped crude pressure naphtha with sulphur dioxide, the hydrocarbon and liquid sulphur dioxide layers are separated. The liquid sulphur dioxide layer was then heated for evaporation of its sulphur dioxide content, and there was secured as an extracted product an oil equal to 68.5% of the original naphtha treated. This extract had the following properties:

| | |
|---|---:|
| Gravity °A. P. I. | 45.6 |
| Initial boiling point | 225° F. |
| 20% | 266° F. |
| 50% | 312° F. |
| 90% | 396° F. |
| Final boiling point | 444° F. |
| Per cent sulphur | 1.92 |
| C/H ratio | 84.79/12.67 |
| Miscibility with an equal volume of 95% ethyl alcohol | |
| Complete above | 79° F. |
| Aniline point | |
| 200–300° F. fraction | 90.4° F. |
| 300–400° F. fraction | 81.0° F. |

It will be seen that the extracted product because of its greater alcohol solubility and the concentration of aromatic, unsaturated and sulphur compounds is an excellent material for use in denaturing alcohols and may be added for that purpose to 95% alcohol in amounts between 1% and 5%. It is difficult or impossible to separate by distillation, and when added to 95% alcohol in 1½ percentage, by volume, the alcohol may be diluted to 67.5% before the first appearance of turbidity.

While the aforementioned extract constitutes an excellent denaturant, it has been discovered that a product of still superior properties may be derived by subjecting such extract to re-extraction with sulphur dioxide in the presence of an added refined oil. For this purpose, the extract thus obtained may be blended with an equal proportion of a refined oil of different boiling range than the extract. The mixed refined oil and sulphur dioxide extract is then treated with twice its volume of sulphur dioxide. Upon settling, there is secured a separation of hydrocarbon and liquid sulphur dioxide layers. The liquid sulphur dioxide layer is separated from the hydrocarbon and treated for the removal of the sulphur dioxide, thereby producing an extracted product of petroleum. When this extracted product is re-distilled to secure substantially the same boiling point range as the original pressure naphtha, a yield of 37.6% of extracted and re-distilled product is obtained, which possess the following properties:

| | |
|---|---|
| Gravity °A. P. I. | 36.3 |
| Initial boiling point | 257° F. |
| 20% | 299° F. |
| 50% | 366° F. |
| 90% | 403° F. |
| Final boiling point | 447° F. |
| Per cent sulphur | 1.93 |
| C/H ratio | 87.1/11.9 |
| Miscibility with an equal volume of 95% ethyl alcohol_____Complete above__ | 58° F. |
| Aniline point | |
| 200–300° F. fraction | 52.4° F. |
| 300–400° F. fraction | 23.7° F. |

Such double treatment with liquid sulphur dioxide concentrates the unsaturates and aromatics and results in a new product having many advantages. Due to its concentration of unsaturated and aromatic constituents, it is an exceptionally efficient solvent for certain paint materials; also as a denaturant for alcohol it possesses greater solubility. A 95% alcohol containing 1½% of such extract may, for example, be diluted to 65% before the diluted alcohol first appears turbid.

The process of extracting and concentrating the unsaturates and aromatics by liquid sulphur dioxide may be further repeated in a like manner to give a further concentration of unsaturates and aromatics. For example, the product obtained by the above described second extracting operation, before the re-distillation, was again blended with an equal quantity of refined oil of different range of boiling points than the original pressure naphtha processed and the mixed oils then treated with twice their volume of liquid sulphur dioxide. After treatment, the hydrocarbon and liquid sulphur dioxide layers were separated and an extracted product obtained by evaporation of the sulphur dioxide from the sulphur dioxide layer. The extracted product was then distilled in order to secure that portion having the same boiling point range as the original pressure naphtha, and there resulted a yield of 21.6% of the original crude naphtha. This product had the following properties:

| | |
|---|---|
| Gravity °A. P. I. | 32.4 |
| Initial boiling point | 266° F. |
| 20% | 310° F. |
| 50% | 346° F. |
| 90% | 421° F. |
| Final boiling point | 466° F. |
| Per cent sulphur | 1.97 |
| C/H ratio | 86.25/11.02 |
| Miscibility with an equal volume of 95% ethyl alcohol Complete above__ | 36° F. |
| Aniline point | |
| 200–300° F. fraction | 19.4° F. |
| 300–400° F. fraction_____Below__ | −15.0° F. |

In a similar manner, other petroleum oils may be treated for producing second and third sulphur dioxide extracts, giving products concentrated in unsaturated and aromatic constituents. These products may be added as denaturants for alcohol and give greater dilution before the first appearance of turbidity. For example, crude kerosene distillates from California crude oil when treated with an equal volume of liquid sulphur dioxide give a yield of about 22.4% extracted product. Ninety-five per cent alcohol containing 1½ percent, by volume, of this product can be diluted with water to 72% before the first appearance of turbidity. When this material is again extracted with sulphur dioxide in the presence of a refined oil of different boiling range, a yield of about 14.2% of a second extracted product may be obtained. Ninety-five per cent alcohol containing 1½ per cent of this extracted product can be diluted with water to 69.5% before the first appearance of turbidity. In the case of treated kerosene distillates for second extracts with sulphur dioxide, the refined oil added may be one of lower boiling range than the kerosene, such as having a boiling range of 200 to 300° F. It is also understood that in each case where a second and third extraction is made the extracted product should be re-distilled to its original boiling point range.

The extract in the second treatment may be further concentrated in unsaturates and aromatics by again blending with a low boiling refined oil, again treating with sulphur dioxide and separating extract, and re-distilling for original boiling points. A yield of about 12% of the original kerosene treated is secured and 95% alcohol containing 1½% of this product can be diluted with water to 67% before the first appearance of turbidity.

While the particular processes and products herein described are well adapted to carry out the objects of the invention, it is understood that various modifications and changes may be made without departing from the principles of the invention or the scope of the appended claims.

I claim:

1. A process of producing concentrated extracts of the unsaturated and aromatic constituents of a petroleum oil, which comprises extracting with sulphur dioxide aromatic and unsaturated constituents of the petroleum oil, separating the extracted oil from the sulphur dioxide, and admixing with the extract a petroleum oil which has been denuded of the greater part of its unsaturated and aromatic bodies, and conducting a second extraction of the admixed oils with sulphur dioxide.

2. A process of producing an extract of the aromatic and unsaturated constituents of a petroleum oil, which comprises subjecting the petroleum oil to extraction with sulphur dioxide, separating the extract from the unextracted oil, and admixing with the extract a petroleum oil having different range of boiling points than the original oil treated and denuded of unsaturated and aromatic bodies, and subjecting the admixed oils to extraction treatment with sulphur dioxide.

3. A process of producing an extract of aromatic and unsaturated constituents of petroleum oil, which comprises subjecting the petroleum oil to extraction with liquid sulphur dioxide, separating the sulphur dioxide extract from the remaining oil, admixing therewith a petroleum oil of higher range of boiling points than the original oil treated and denuded of unsaturated and aromatic constituents, and subjecting the admixed oils to extraction with sulphur dioxide.

4. A process of producing an extract concentrated in unsaturated and aromatic constituents of petroleum oil, which comprises treating a relatively low boiling point distillate of petroleum with sulphur dioxide to form an extract relatively rich in aromatic and unsaturated constituents, then mixing the extracted oil with a petroleum oil of relatively higher range of boiling points than the original oil treated and which has been denuded of unsaturated and aromatic bodies, subjecting the admixed oils to extraction with sulphur dioxide, separating the extract from the unextracted oils, and re-distilling the extracted oil to form a product having substantially the same boiling points as the oil first treated.

5. A process of producing an extract of the sulphur aromatic and unsaturated constituents of petroleum, which comprises mixing sulphur dioxide with a petroleum oil, then settling and removing the sulphur dioxide extract, mixing the extract with a petroleum oil of different range of boiling points than the one first treated, the added oil having been denuded of unsaturated and aromatic bodies, subjecting the mixed oils to extraction with sulphur dioxide, separating the sulphur dioxide extract from the remaining oil, and re-distilling the extract to form a product having substantially the boiling point range of the oil first treated.

6. A process of producing an extract of the aromatic and unsaturated constituents of petroleum oil, which comprises subjecting the petroleum oil to extraction with liquid sulphur dioxide, separating the extract from the unextracted oil, and thereafter subjecting the extract to multiple extraction with sulphur dioxide in the presence of added petroleum oil of a different range of boiling points than the original oil treated, the added oil having been denuded of unsaturated and aromatic bodies.

7. A process of producing an extract of aromatic and unsaturated constituents of petroleum oil, which comprises subjecting the petroleum oil to multiple extraction with liquid sulphur dioxide, separating the sulphur dioxide extract from the remaining oil after each extraction, and admixing therewith a petroleum oil of higher range of boiling points between each extraction operation, said added oil having been denuded of unsaturated and aromatic bodies.

8. A process of producing an extract concentrated in the unsaturated and aromatic constituents of petroleum oil, which comprises treating a petroleum distillate with liquid sulphur dioxide to form an extract relatively rich in unsaturated and aromatic constituents, settling and removing the sulphur dioxide extract, admixing with the said extract about an equal volume of a petroleum oil of different boiling point range from that of the original oil treated, said added oil having been refined for removal of unsaturated and aromatic bodies, and subjecting the admixture to a second treatment with liquid sulphur dioxide.

9. A process of producing an extract concentrated in the unsaturated and aromatic constituents of petroleum oil, which comprises treating a petroleum distillate with liquid sulphur dioxide to form an extract relatively rich in unsaturated and aromatic constituents, settling and removing the sulphur dioxide extract, admixing with the said extract about an equal volume of a petroleum oil of different boiling point range from that of the original oil treated, said added oil having been refined for removal of unsaturated and aromatic bodies, and subjecting the admixture to a second treatment with liquid sulphur dioxide in an amount about equal to that applied in the first liquid sulphur dioxide treatment.

10. A process of producing an extract concentrated in the unsaturated and aromatic constituents of petroleum oil, which comprises treating a petroleum oil with about twice its volume of liquid sulphur dioxide, settling and removing the sulphur dioxide extract, admixing with the said extract about an equal volume of a petroleum oil of different boiling point range from that of the original oil treated, said added oil having been refined for removal of unsaturated and aromatic bodies and treating the admixed extract and refined petroleum oil with about twice its volume of liquid sulphur dioxide.

11. A process of producing an extract concentrated in unsaturated and aromatic constituents of petroleum oil, which comprises treating a relatively low boiling point distillate of petroleum with about twice its volume of liquid sulphur dioxide, settling and removing the sulphur dioxide extract, admixing with the said extract about an equal volume of a petroleum oil of different boiling point range from that of the original oil treated, said added oil having been refined for removal of unsaturated and aromatic bodies, treating the admixed extract and refined petroleum oil with about twice its volume of liquid sulphur dioxide, settling and removing the sulphur dioxide extract from the second sulphur dioxide treatment, and distilling the said second sulphur dioxide extract to obtain a product having substantially the boiling point range of the oil originally treated.

JOHN T. RUTHERFORD.